United States Patent
Schneider et al.

(10) Patent No.: US 10,519,988 B2
(45) Date of Patent: Dec. 31, 2019

(54) PRESSURE RETAINING VALVE

(71) Applicant: HYDAC FLUIDTECHNIK GMBH, Sulzbach/Saar (DE)

(72) Inventors: Gerd Schneider, Dillingen (DE); Markus Bill, Heusweiler (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 14/912,947

(22) PCT Filed: Aug. 14, 2014

(86) PCT No.: PCT/EP2014/002253
§ 371 (c)(1),
(2) Date: Feb. 19, 2016

(87) PCT Pub. No.: WO2015/032470
PCT Pub. Date: Mar. 12, 2015

(65) Prior Publication Data
US 2016/0195114 A1 Jul. 7, 2016

(30) Foreign Application Priority Data
Sep. 4, 2013 (DE) .................. 10 2013 014 673

(51) Int. Cl.
*F15B 13/04* (2006.01)
*F16K 37/00* (2006.01)

(52) U.S. Cl.
CPC ...... *F15B 13/0401* (2013.01); *F16K 37/0041* (2013.01)

(58) Field of Classification Search
CPC .. F16K 37/0041; F15B 13/0402; F15B 13/01; G05D 16/2024; G05D 16/2097

(Continued)

(56) References Cited

U.S. PATENT DOCUMENTS

| | | | | |
|---|---|---|---|---|
| 2,664,674 A | * | 1/1954 | Niesemann | G05D 16/0663 137/116.5 |
| 3,495,619 A | * | 2/1970 | Tomomitsu | F16K 31/36 137/116.5 |

(Continued)

FOREIGN PATENT DOCUMENTS

| DE | 86 23 832 | 12/1986 |
|---|---|---|
| DE | 197 54 242 | 6/1999 |

(Continued)

OTHER PUBLICATIONS

International Search Report (ISR) dated Nov. 12, 2014 in International (PCT) Application No. PCT/EP2014/002253.

*Primary Examiner* — Craig M Schneider
*Assistant Examiner* — Angelisa L. Hicks
(74) *Attorney, Agent, or Firm* — Wenderoth, Lind & Ponack, L.L.P.

(57) ABSTRACT

A pressure retaining valve (1) has a main control piston (39) guided longitudinally displaceably in a single-piece or multiple-piece valve housing (29) and a non-return piston (43). In a pressure retaining position, a fluid-conducting connection between connection points (37a, 37b, 21) is shut off by the two pistons (39, 43). Connection point (37a) serves to feed media. Connection point (37b) discharges media. Connection point (21) leads to a hydraulic consumer. In a load-raising position, the two pistons (43) move relative to one another into a release position, in which the connection between the medium feed (37a) and the consumer is established. In a load-reducing position, the two pistons (39, 43) assume a spacing from one another such that the connection between the medium discharge (37b) and the consumer is established. A monitoring device (75) determines the individual switching positions of the pistons (39, 43) to ensure reliable functioning of the pressure retaining valve (1).

29 Claims, 6 Drawing Sheets

(58) Field of Classification Search
USPC ............... 251/18, 20, 22, 25, 26, 28, 29, 45
See application file for complete search history.

(56) References Cited

U.S. PATENT DOCUMENTS

| | | | | |
|---|---|---|---|---|
| 4,338,856 | A * | 7/1982 | Smilges | F15B 13/01 137/492.5 |
| 4,346,733 | A * | 8/1982 | Grawunde | F15B 13/01 137/454.5 |
| 4,757,839 | A * | 7/1988 | Marchal | F16K 17/082 137/489.5 |
| 4,938,118 | A * | 7/1990 | Wolfges | G05D 16/2093 137/625.64 |
| 6,116,263 | A * | 9/2000 | Liberfarb | F15B 11/055 137/115.03 |
| 6,199,585 | B1 * | 3/2001 | Reith | F15B 13/0402 137/554 |
| 6,300,617 | B1 * | 10/2001 | Daughton | G01R 15/205 250/214.1 |
| 7,467,642 | B2 * | 12/2008 | Prinsen | F16K 17/0433 137/491 |
| 8,271,141 | B2 * | 9/2012 | Cummings | F15B 19/005 137/55 |
| 2003/0131896 | A1 * | 7/2003 | Yajima | F15B 13/0402 137/625.65 |
| 2009/0212244 | A1 * | 8/2009 | Pfaff | F15B 13/0405 251/30.03 |
| 2011/0272044 | A1 * | 11/2011 | Bolyard, Jr. | F16K 15/025 137/492.5 |
| 2013/0255809 | A1 * | 10/2013 | Bruck | F15B 13/0433 137/625.6 |

FOREIGN PATENT DOCUMENTS

| | | |
|---|---|---|
| DE | 100 42 716 | 3/2002 |
| DE | 100 56 876 | 5/2002 |
| DE | 102 57 888 | 6/2004 |

* cited by examiner

PRESSURE RETAINING VALVE

FIELD OF THE INVENTION

The invention relates to a pressure retaining valve having at least one main control piston guided longitudinally displaceably in a single-piece or multiple-piece valve housing and a non-return piston. In a load-holding position, a fluid-conducting connection between at least two connection ports is shut off by the two pistons, with one connection port serving to supply or return media and the other connection point leading to a hydraulic actuator. In a load-lifting position, the two pistons move relative to one another into a release position, in which the connection between the media supply (37) and the consumer is established. In a load-lowering position, the two pistons assume a predefinable spacing from one another in such a way that the connection between the media return and the consumer is established.

BACKGROUND OF THE INVENTION

Pressure retaining valves of this type are in the prior art. In conjunction with hydraulic actuators in the form of load-lifting power cylinders, such valves also are referred to as counterbalance valves in technical terminology. Load-lifting power cylinders are frequently used in tools and equipment, also in the form of mobile devices such as excavators, forklifts and the like. Typically in such cases, an operator can control the pressure retaining valve by manual actuation of a control valve device. To prevent operating errors on the part of the staff in doing so, and preclude resulting hazards for both the equipment as well as for persons to the extent possible, due care shall be taken to ensure that the handling operations for the staff are simple and clear.

SUMMARY OF THE INVENTION

In view of these problems, the invention addresses providing an improved pressure retaining valve, for which the risk of incorrect operation and resulting malfunctions is minimized.

According to the invention, this problem is solved by a pressure retaining valve having, as one essential feature of the invention, a monitoring device that detects the individual switching positions of the piston of the valve to ensure a reliable functioning of the pressure retaining valve. Due to the fact that the operator and/or an automatic machine control (PLC) has information about the respective switching state, the control operation proves to be simple and clear, substantially reducing the risk of incorrect operation.

With particular advantage, the monitoring device may be designed in such a way that the main control piston and/or the non-return piston interact with a signaling device. The signaling device inductively alters a field generated by a measuring device, as soon as the position of the signaling device changes in relation to the measuring device, due to the movement of the main piston and/or the non-return piston.

In a particularly advantageous manner, an inductive travel measuring device is provided as a monitoring device. Where the signaling device includes a control unit connected to the main piston, the control unit has at least partially magnetic field altering constituents, in particular in the form of iron compounds. The measuring device has at least one energizable winding coil, generating the magnetic field. Such an inductive measuring device can be integrated in the valve housing without difficulty or mounted as an additional housing to one end of the valve housing, from which the control unit extends into the additional housing.

In an advantageous manner, the control unit is part of a signal rod. One free end of the signal rod engages with the main control piston. In the area of its other free end, the signal rod extends through a dual coil arrangement, whose individual coils are arranged in series at a predetermined spacing along the travel direction of the signal rod. In such an arrangement, the individual coils may be part of an inductive half-bridge, for a displacement measurement according to the LVDT system (Linear Voltage Differential Transformer). Alternatively or additionally, the programming or design takes into account defined switching points, like a relaxation oscillator (Schmitt trigger). In that regard, only two switching points that can be easily monitored are then required. Another monitoring option is the use of commercially available Hall sensors.

The arrangement can advantageously be made such that a zero or starting position for the measuring device is calibrated relative to the valve housing. When the measuring device departs from the starting position in one direction or another due to the main control piston, starting from a predetermined output voltage, the respective switching position of the valve can be inferred in the manner of a switching point detection.

Preferably, the respective switching point determination for the unambiguous detection of the respective switching position is provided with a kind of hysteresis loop.

The measuring device can be particularly advantageously connected to evaluation electronics, preferably providing the operator with a visual indication of the preferred switching positions on an LED display. The electronic monitoring accomplishes an increase in the diagnostic coverage ratio (DC) in accordance with DIN EN ISO 13849. In doing so, a higher performance level (PL) can be achieved, as well as a higher functional safety level.

In particularly advantageous exemplary embodiments, the valve housing has a stop shoulder for forming the zero or starting position. Against the stop shoulder, the non-return piston abuts in the hold-pressure position. In the load lifting or load lowering position, the main control piston moves forward or backward from a position close to the stop shoulder position towards a frontal housing port as the hydraulic actuator port.

In advantageous exemplary embodiments, in at least one position of the main control piston, a throttled fluid pressure, in addition to a main spring with a preferably adjustable spring force, acts on the main control piston, especially during lowering movements.

As a control valve for controlling the pressure retaining valve for the media supply or return, the pressure retaining valve is advantageously connected to a control valve, in particular in the form of a 4/3-proportional directional valve. Pressure retaining valves should also include and comprise all types of counterbalance valves and all kinds of double check valves of the generic kind.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure

DETAILED DESCRIPTION OF THE INVENTION

Figure 1:
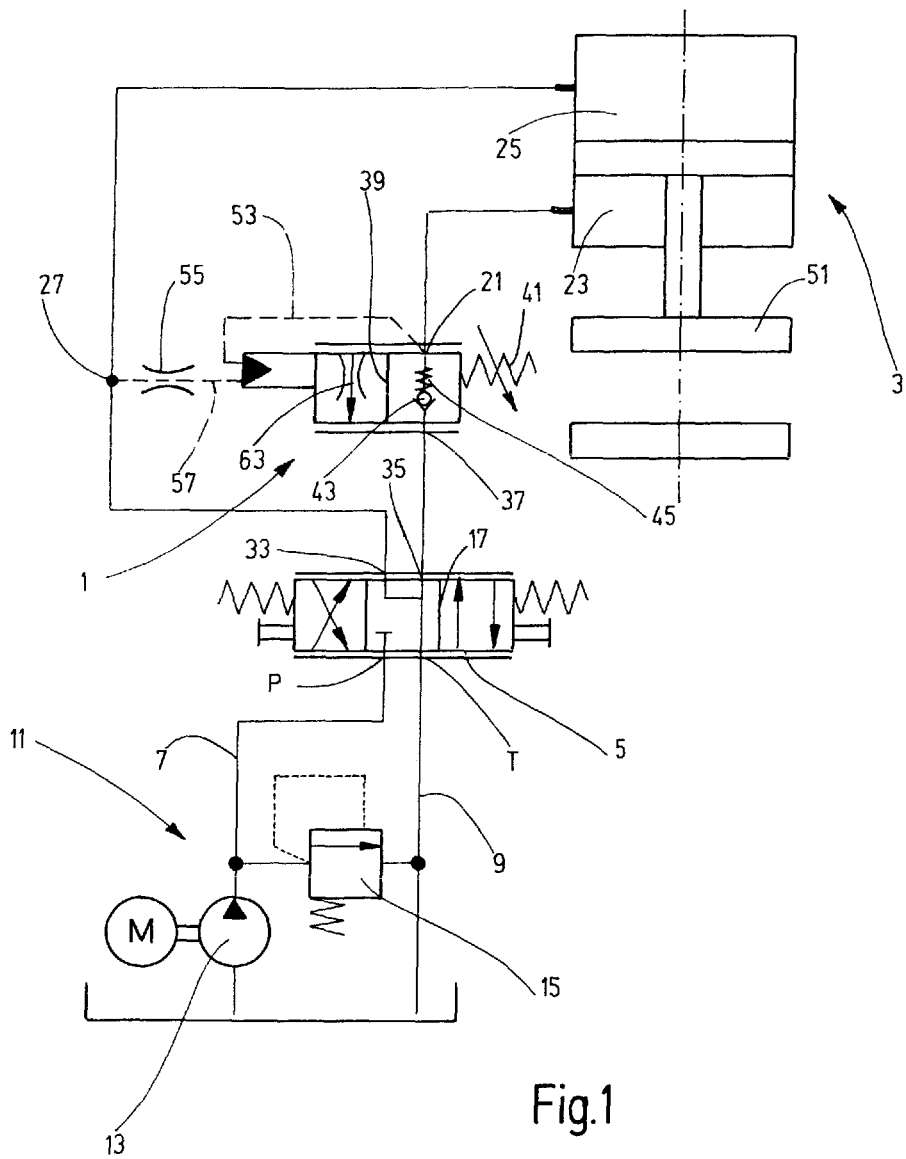
FIG. 1 is a symbolic representation of a circuit of a hydraulic system for supplying an actuator in the form of a power cylinder having a pressure retaining valve according to an exemplary embodiment of the invention.

As shown in the circuit illustration of FIG. 1, the exemplary embodiment of the pressure retaining valve 1 according to the invention, described in detail below, is provided for controlling the operation of a double acting power cylinder 3. For controlling the pressure retaining valve 1, a control valve in the form of a proportional 4/3-directional valve 5 is provided. Its pressure port P and its tank port T are connected to a pressure pipe 7 and tank pipe 9, respectively, of a supply unit 11. The pressure pipe 7 is connected at the pressure side of a motor-driven hydraulic pump 13 and is protected towards the tank pipe 9 via a pressure relief valve 15.

The 4/3-directional valve 5 is spring biased to the position shown in FIG. 1, corresponding to the switch position "hold pressure" of the pressure retaining valve 1. From this valve position, the 4/3-directional valve 5 can be moved by manually controlling its valve piston 17 to the right (with reference to FIG. 1) to the valve position corresponding to the switching position "lift load" of the pressure retaining valve 1. Valve piston 17 can be shifted to the left to the valve position corresponding to the switching position "lower load" of the pressure retaining valve 1.

One actuator or connection port 21 of the pressure retaining valve 1 is connected to the rod side 23 of the power cylinder 3. The piston side 25 of power cylinder 3 is connected to a connection port 27 located, as can be seen, in particular in FIGS. 3 to 6, on the valve housing 29 of the pressure retaining valve 1. The connection port 27 is also connected to a port 33 for media supply or media return at the directional valve 5. An additional valve port 35 of valve 5 for the media supply or media return is selectively connected to a housing or connection pressure supply port 37a or the housing or connection tank port 37b of the pressure retaining valve 1. Main piston 39 of valve 1 is biased into the switching position "hold pressure" shown in FIGS. 1, 3 and 4 by a spring force acting on it, of the adjustable main spring 41. A non-return piston 43 is held by a non-return piston spring 45 in the direction of a locked position, in which the passage between the actuator port 21 and housing ports 37a and 37b are blocked.

Figure 4:
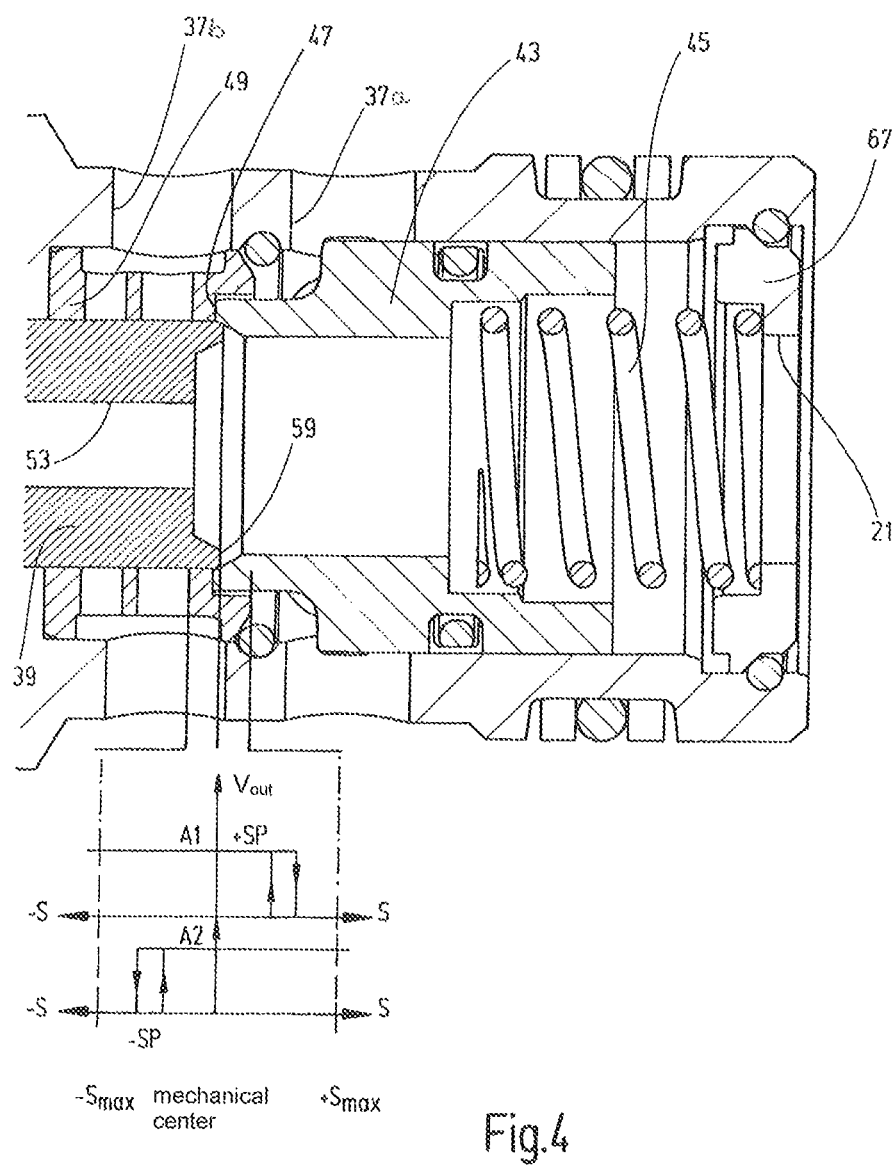
FIG. 4 is a further enlarged, partial side view in section of only that section of the pressure retaining valve of FIG. 2 that is closer to the frontal housing terminal, the switching position "hold pressure" being shown.
Figure 5:
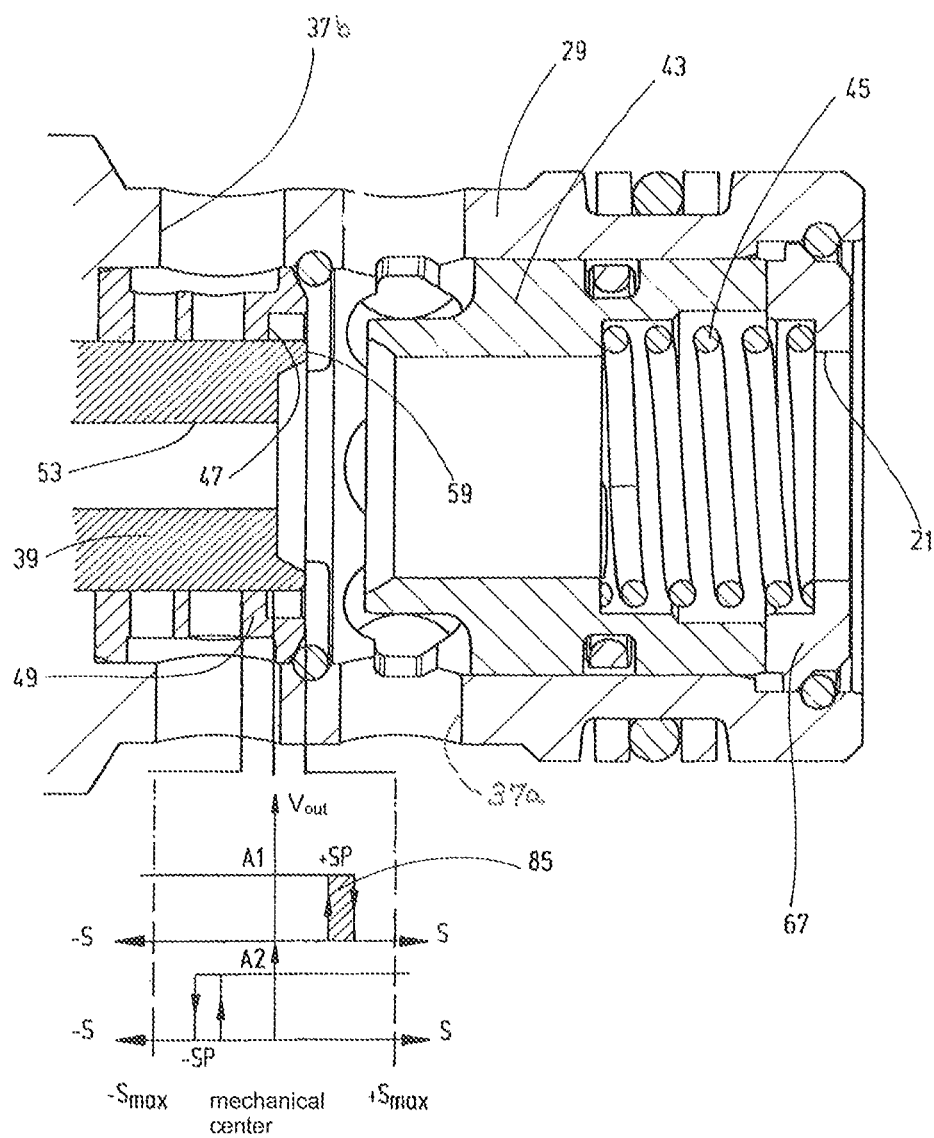
FIGS. 5 and 6 are partial, enlarged side views in section of the pressure retaining valve of FIG. 2, having "lift load" and "lower load" switching positions, respectively.
Figure 6:
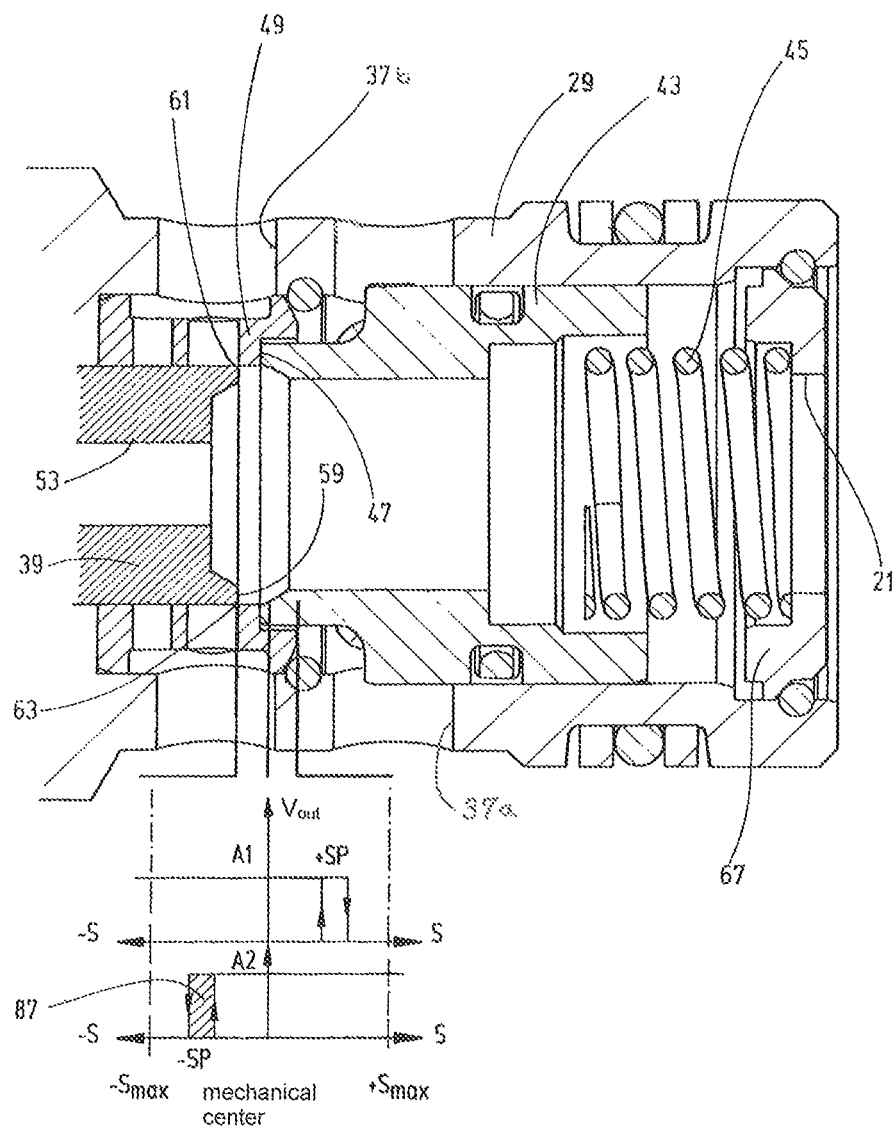

FIGS. 2 to 6 show details of the composition or structure of the pressure retaining valve 1 having an axially movable main piston 39 and a non-return piston 43 inside. The main piston 39 is biased by the main spring 41 in the drawing to the right in the direction of the open end of the valve housing 29 forming the actuator port 21. The non-return piston 43 is biased by the non-return piston spring 45 for movement in the direction away from the actuator port 21 and abuts a stop shoulder 47 at the holding position (FIGS. 1, 3 and 4) and the lowering position (FIG. 6). Stop shoulder 47 is formed at a housing insert 49. As can be seen most clearly in FIG. 4, the main piston 39 abuts the end of the non-return piston 43 at the holding position, after main piston 47 has slightly overrun the stop shoulder 47. For these piston positions, the connection between the actuator port 21 and the housing port 37a or 37b, which connections include two rows of holes in the longitudinal direction of the valve housing 29 consecutively arranged in the valve housing 29, is locked or blocked by the non-return piston 43. The connection port 27, and thus, the piston side 25 of the power cylinder 3, is connected to the tank port T via the valve port 33 (FIG. 1) of the directional valve 5.

For the transition from the holding position to the lifting position or the lowering position, the valve piston 17 of the 4/3-directional valve 5 is moved to the right, viewed in the transition to the lifting position in FIG. 1. The valve 5 then connects the pressure port P to the housing port 37a or 37b of the pressure retaining valve 1, while the connection port 27 connected to the piston side 25 of the power cylinder 3 is released towards the tank port T. The pressure applied to the housing port 37a opens the connection to the actuator port 21 by moving the non-return piston 43 against the force of the spring 45. The load 51 is then lifted by pressure buildup in the rod side 23 of the power cylinder 3. Simultaneously, a control pressure corresponding to the load pressure of the rod side 23 of the power cylinder 3 acts from the actuator port 21 side via a control pipe 53 on the main piston 39. Media flowing away from the side of the piston 25 during the lifting process reaches the tank port T via the connection port 27 and the valve port 33 of the directional valve 5.

If the directional control valve 5 is moved back from the lifting position to the holding position shown in FIG. 1, the actuator port 21 is blocked by the non-return piston 43, and the piston side 25 of the power cylinder 3 remains connected to the tank port T via the connection port 27 and the valve port 33 of the directional control valve 5.

If the valve piston 17 of the directional control valve 5 moves to the left, viewed from the lifting position in FIG. 1, for the switching position "lower load", the pressure port P is connected to the piston side 25 of the power cylinder 3 via the valve port 33 and the connection port 27. For media return on the rod side 23 through the actuator port 21, a movement of the main piston 39 against the force of main spring 41 into a position shown in FIG. 6 is effected, because the media pressure supplied by the valve port 33 of the directional control valve 5 acts on the main piston 39 via the connection port 27 and via a restrictor 55 in an additional control pipe 57 (in FIG. 3 in the form of a control fluid chamber). In this position, the main piston 39, as shown in FIG. 6, forms a restriction with a variable control cross-section between its final rim 59 and an edge 61. The restriction 63 in FIGS. 1 and 6 controls the media outflow to the housing port 37b from the actuator port 21 during lowering. As can be seen most clearly in FIG. 3, during lifting, a control pressure acts on the main piston 39 from the actuator port 21 via the control pipe 53, which acts on the main piston 39 in the same direction as the main spring 41. The control pipe 53 is formed by an axial bore in the main piston 39, which results in an annular section 65 formed by a piston shoulder. The pressure acting at the actuator port 21 also acts on the main piston 39 against the spring 41. The resultant acts as a force against the spring 41. Further, a pressure-limiting function is implemented, in which the valve 1 is set to the open position.

Figure 3:
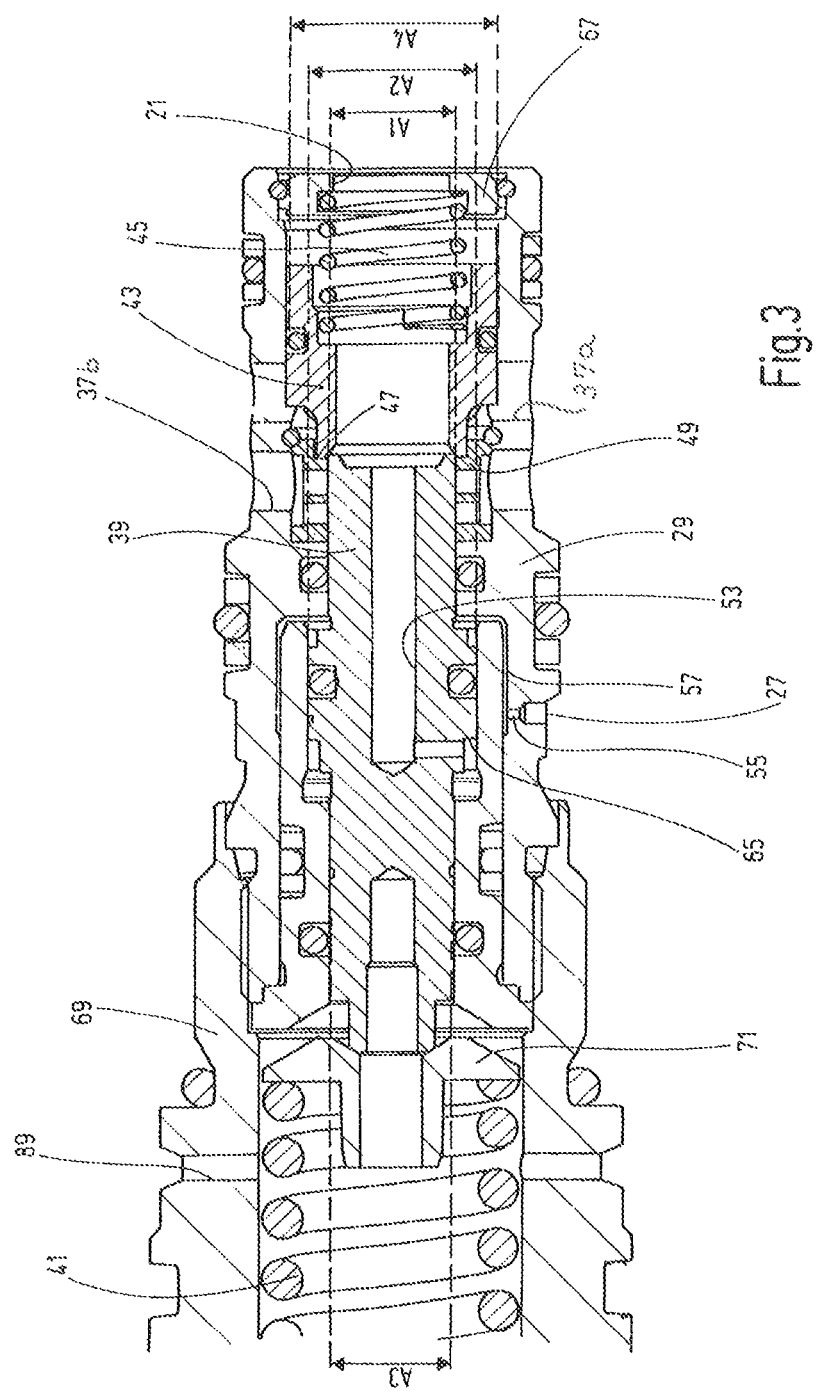
FIG. 3 is a partial, enlarged side view in section only of that part of the pressure retaining valve of FIG. 2 that adjoins a frontal housing port.

The pressure surfaces effective at the non-return piston 43 and at the main piston 39 are indicated in FIG. 3 by A1 through A4. During load lifting, the pump pressure at the housing port 37a opens the non-return piston in the form of a hollow piston 43 via the annular section A4-A1 against the non-return piston spring 45. Spring 45 is clamped between the non-return piston 43 and a retaining ring 67 at the open end of the housing 29. During pressure holding, the load pressure at the actuator port 21 acts on the resulting surface A1-(A2-A3) against the biasing force of the main spring 41. During load lowering, the actuating pressure prevailing at the connection port 27 acts on the annular section A2-A1 and opens together with the load pressure at actuator port 21 the main piston 39 against the biasing force of the main spring 41.

Connected opposite the open end of the valve housing 29 forming the actuator port 21 is a spring housing 69 for the main spring 41. This main spring 41 is supported at one end via a spring plate 71 by the facing end of the main piston 39. The other end of the main spring 41 is supported on the end of a measurement housing 73 screwed into the spring housing 69. Spring housing 69, in turn, holds an end section of a monitoring device 75. This monitoring device 75 provides, for instance, an inductive position measurement by the known LVDT system (Linear Voltage Differential Transformer) and has two energizable, magnetic field-generating coil windings 77 and 79. As components of an inductive half-bridge, the winding coils 77, 79 act in conjunction with a signaling device in the form of a rod-shaped control unit 81. Control unit 81 is connected at one end to the main piston 39 and is axially movable with the latter. At its other end, control unit 81 has an end section 83 of a highly permeable ferrite that is movable as a coil core within the winding coils 77, 79.

By changes of the inductance of the coil windings 77, 79, caused by axial movements of the end section 83 corresponding to movements of the main piston 39 and the resulting changes in the bridge voltage Vout, the respective switching positions of the pressure retaining valve 1 are determined based on a zero or starting position, by evaluation electronics of the prior art. This starting position is, as schematically indicated in FIGS. 4 to 6 and referred to as the mechanical center, calibrated in such a way that it corresponds to the position of the final rim 59 of the main piston 39 in the switching position "hold pressure". In case of a bridge circuit, this position can correspond to an output voltage "high", on both outputs A1 and A2. During the transition to "lift load" the main piston 39 moves a distance S in FIG. 5 to the right, resulting in an output voltage.

For the unambiguous determination of a switching point, a hysteresis range 85 is taken into account, which extends over a small section of the distance. The same applies to the state shown in FIG. 6 "lower load" with a corresponding movement of the control piston 39 from the mechanical center towards the left. The corresponding characteristic output voltage in turn is used for the detection of the switching point in a hysteresis range 87 over a small distance section.

Altogether, for two switching channels the following states result according to the following table:

|  | Channels | |
| --- | --- | --- |
|  | A1 | A2 |
| Center or neutral position | high | high |
| Lift | low | high |
| Lower | high | low |

Figure 2:
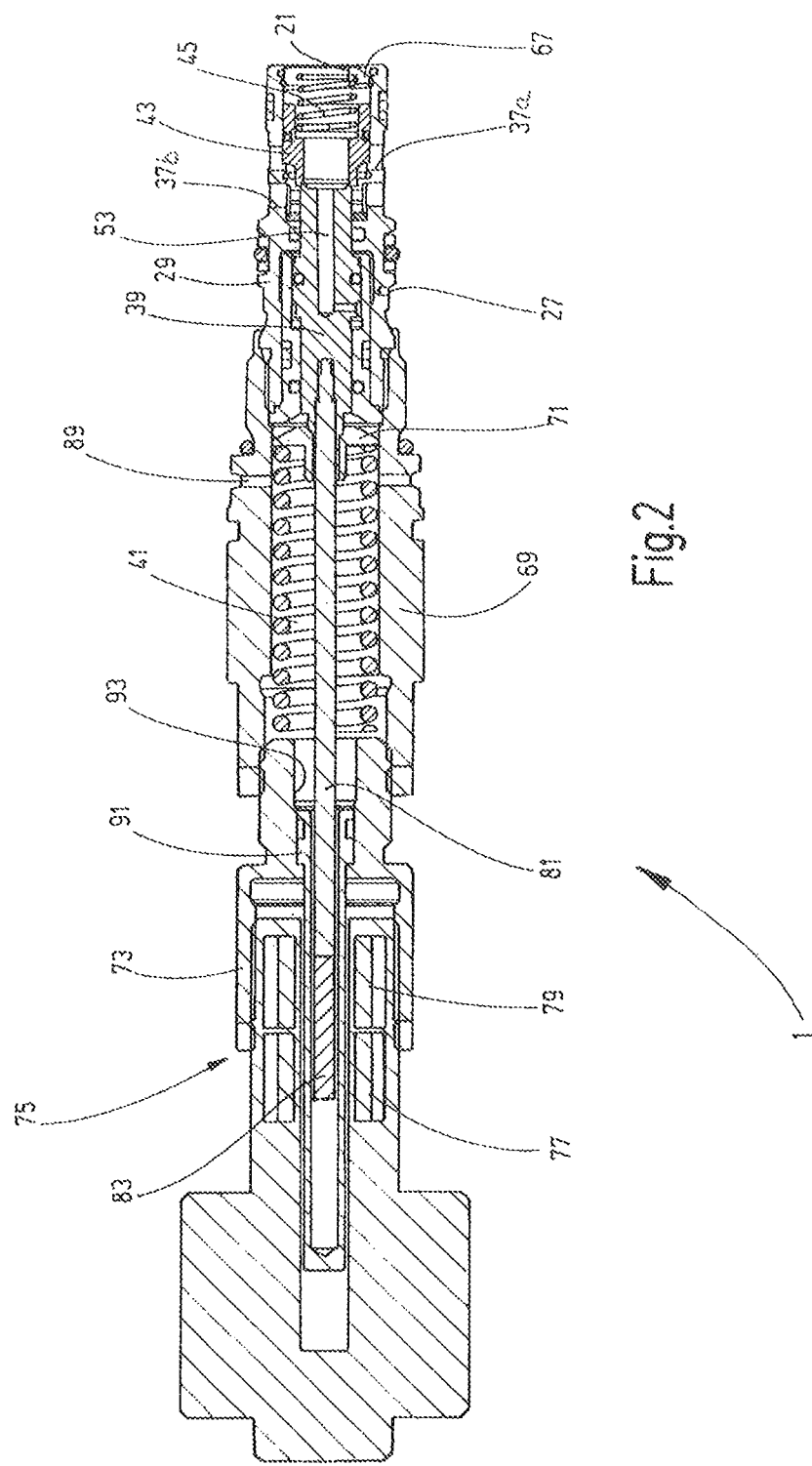
FIG. 2 is a side view in section of a pressure retaining valve according to an exemplary embodiment of the invention.

As FIGS. 2 and 3 show, an air bleeder 89 is formed in the spring housing 69. The rod-shaped control unit 81 is guided on the end section 75 projecting into the monitoring device in a guide sleeve 91, which guide sleeve is held in the measuring housing 73 in the bore 93 facing the main spring 41.

While one embodiment has been chosen to illustrate the invention, it will be understood by those skilled in the art that various changes and modifications can be made therein without departing from the scope of the invention as defined in the claims.

The invention claimed is:

1. A pressure retaining valve, comprising:
a valve housing having a main control piston and a non-return piston, each of said main control piston and said non-return piston being releasably engaged in direct contact with one another and being individually and longitudinally displaceable in said valve housing between
a pressure holding switching position closing a fluid-conducting connection between supply, tank and actuator connection ports in said valve housing by said pistons where said supply connection port supplies fluid media, said tank connection port returns fluid media and extends through said valve housing, and said actuator connection port leads to a hydraulic actuator connected to said valve housing,
a load-lifting switching position in which said pistons move relative to one another in said valve housing into a release position connecting said supply connection port in said valve housing with said actuator connection port in fluid communication and closing said tank connection port, and
a load-lowering switching position spacing said pistons from one another by a predefinable distance connecting said tank connection port in said valve housing with said actuator connection port in fluid communication and closing said supply connection port; and
a monitoring device coupled to said valve housing determining the switching positions individually of said pistons ensuring reliable functioning of the pressure retaining valve.

2. A pressure retaining valve according to claim 1 wherein at least one of said main control piston or said non-return piston interact with a signaling device that inductively alters a field generated by a measuring device as soon as a position of said signaling device changes relative to said measuring device due to movement of at least one of said main piston or said non-return piston.

3. A pressure retaining valve according to claim 2 wherein said signaling device comprises a control unit connected to said main control piston, said control unit having at least partially magnetic field altering constituents; and said measuring device has an energizable winding coil generating a magnetic field.

4. A pressure retaining valve according to claim 3 wherein said magnetic field altering constituents comprise iron compounds.

5. A pressure retaining valve according to claim 3 wherein said control unit is part of a signal rod having a first free end engaging said main control piston and having a second free end area extending through a dual coil arrangement, said dual coil arrangement having individual coils arranged in series at a predetermined spacing along a travel direction of said signal rod.

6. A pressure retaining valve according to claim 3 wherein said main control piston is acted on by a throttled fluid pressure, a main spring and a control pressure controlled by said actuator connection port when in the load-lowering switching position.

7. A pressure retaining valve according to claim 6 wherein said main spring has an adjustable spring force.

8. A pressure retaining valve according to claim 2 wherein said measuring device has a starting position calibrated relative to said valve housing, movement of said main control piston in either direction from the starting position allowing an inference to be made about the respective switching position starting from an output voltage providing a switching point detection.

9. A pressure retaining valve according to claim 8 wherein the switching point detection determines unambiguously the respective switching position via a hysteresis loop.

10. A pressure retaining valve according to claim 8 wherein
said valve housing comprises a stop shoulder abutted by said non-return piston in the pressure holding switching position defining the starting position; and
said main control piston is movable in either direction from a position close to said stop shoulder to the load-lifting and load lowering switching positions towards said actuator connection port on a front end of said valve housing.

11. A pressure retaining valve according to claim 2 wherein
said measuring device is connected to evaluation electronics.

12. A pressure retaining valve according to claim 11 wherein
said evaluation electronics comprises an LED display visually indicating the switching positions.

13. A pressure retaining valve according to claim 1 wherein
a control valve is connected to said valve housing and controls a fluid media supply and a fluid media return and operates both of said main control piston and said non-return piston.

14. A pressure retaining valve according to claim 13 wherein
said control valve comprises a 4/3 proportional directional valve.

15. A pressure retaining valve according to claim 1 wherein
in the load-lowering switching position of said main control piston, a throttled fluid pressure, a main spring and a control pressure act on the hydraulic actuator via said actuator connection port.

16. A pressure retaining valve according to claim 1 wherein
said main control piston and said non-return piston are coaxial relative to one another relative to a longitudinal axis and are movable along said longitudinal axis.

17. A pressure retaining valve according to claim 16 wherein
said non-return piston is located between said main control piston and said actuator connection port along said longitudinal axis.

18. A pressure retaining valve according to claim 16 wherein
said supply and tank connection ports are located radially next to said pistons relative to said longitudinal axis and are spaced from each other relative to said longitudinal axis.

19. A pressure retaining valve according to claim 1 wherein
said non-return piston is coaxial to and is located between said main control piston and said actuator connection port along a longitudinal axis, said main control piston and said non-return piston being movable along said longitudinal axis.

20. A pressure retaining valve according to claim 1 wherein
said main control piston and said non-return piston are movable to positions closing all of said connection ports simultaneously.

21. A pressure retaining valve according to claim 1 wherein
said supply and tank connection ports comprises first and second openings, respectively, in said valve housing separable from and another by a part of said valve housing; and
said actuator connection port comprises a third opening in said valve housing separable from said first and second openings by a part of said valve housing.

22. A pressure retaining valve according to claim 21 wherein
said third opening is an axial end of said valve housing; and
said first and second openings are in lateral sides of said valve housing.

23. A pressure retaining valve according to claim 1 wherein
each of said main control piston and said non-return piston is an integral structure without relatively movable parts.

24. A pressure retaining valve according to claim 1 wherein
said supply connection port and said tank connection port are directly engaged by said main control piston and said non-return piston.

25. A pressure retaining valve according to claim 1 wherein
hydraulic fluid is conveyed through said ports.

26. A pressure retaining valve according to claim 1 wherein
said non-return piston is hollow.

27. A pressure retaining valve, comprising:
a valve housing having a main control piston and a non-return piston being releasably engaged in direct contact with one another, both of said main control piston and said non-return piston being individually and longitudinally displaceable in said valve housing between
a pressure holding switching position closing a fluid-conducting connection between supply, tank and actuator connection ports in said valve housing by said pistons where said supply connection port supplies fluid media, said tank connection port returns fluid media and extends through said housing and said actuator connection port leads to a hydraulic actuator connected to said valve housing,
a load-lifting switching position in which said pistons move relative to one another in said valve housing into a release position connecting said supply connection port in said valve housing with said actuator connection port in fluid communication and blocking said tank connection port from fluid communication with said supply connection port and said actuator connection port, and
a load-lowering switching position spacing said pistons from one another by a predefinable distance connecting said tank connection port in said valve housing with said actuator connection port in fluid communication and blocking said supply connection port from fluid communication with said tank connection port and said actuator connection port; and
a monitoring device coupled to said valve housing determining the switching positions individually of said pistons ensuring reliable functioning of the pressure retaining valve.

28. A pressure retaining valve according to claim 27 wherein said supply and tank connection ports comprises first and second openings, respectively, in said valve housing separable from and another by a part of said valve housing relative to a longitudinal axis along which said pistons are movable; and said actuator connection port comprises a third opening in said valve housing separable from said first and second openings by a part of said valve housing and being coaxial to said pistons relative to said longitudinal axis.

29. A pressure retaining valve according to claim 28 wherein said third opening is in an axial end of said valve housing; and said first and second openings are in lateral sides of said valve housing.

* * * * *